United States Patent [19]

Itoh et al.

[11] 4,119,489

[45] Oct. 10, 1978

[54] METHOD OF USING NUCLEAR REACTOR FUEL ASSEMBLY

[75] Inventors: Kenichi Itoh, Hitachi; Katsutoshi Shinbo, Katsuta; Minoru Watahiki, Hitachi, all of Japan

[73] Assignee: Hitachi, Ltd., Japan

[21] Appl. No.: 647,455

[22] Filed: Jan. 8, 1976

[30] Foreign Application Priority Data

Jan. 8, 1975 [JP] Japan ................................. 50/4423

[51] Int. Cl.² .............................................. G21C 3/30
[52] U.S. Cl. ........................................ 176/76; 176/78
[58] Field of Search ............................. 176/30, 76, 78

[56] References Cited

U.S. PATENT DOCUMENTS

| 3,398,050 | 8/1968 | Yeyick et al. | 176/30 X |
| 3,697,375 | 10/1972 | Suvanto et al. | 176/30 X |
| 3,856,621 | 11/1974 | Suvanto et al. | 176/30 |
| 3,910,818 | 10/1975 | Sofer | 176/30 X |

FOREIGN PATENT DOCUMENTS 923,633  4/1963  United Kingdom ..................... 176/30

Primary Examiner—Peter A. Nelson
Attorney, Agent, or Firm—Beall & Jeffery

[57] ABSTRACT

A nuclear fuel assembly having a bundle of longitudinal fuel elements vertically disposed in a reactor vessel, an upper and a lower tie plate supporting the top and the bottom of the bundle of the fuel elements, a fully ended tubular channel covering around the bundle of the fuel elements to define a coolant flow passage. The channel is removably supported by the upper tie plate. After a predetermined operating period, the channel is pulled out from the fuel assembly, turned upside down and thereafter again inserted over the fuel assembly in a upended state so that the life time of the channel is elongated.

7 Claims, 5 Drawing Figures

METHOD OF USING NUCLEAR REACTOR FUEL ASSEMBLY

BACKGROUND OF THE INVENTION

The present invention relates to improvements of nuclear fuel assemblies and more particularly to an method of using a channel covering a bundle of fuel elements and to an improved channel structure for the method.

In a nuclear reactor, fuel elements which contain nuclear fuel are provided with tubular claddings and grouped together at fixed distance from each other in a coolant flow channel as a fuel assembly. Sufficient fuel assemblies are enclosed in a reactor vessel to form a reactor core. The heat generated by the nuclear fuel is removed by passing a coolant inside the channel from the bottom to the top of the fuel elements. The channel is made of thin plate and usually has a square cross section and a tubular shape. Exemplary of the prior arts are U.S. Pat. Nos. 3,350,275 and 3,338,791, which disclose precise structure of the conventional fuel assemblies.

The reaction continues as long as sufficient fissionable material exists in the fuel elements, however, the life time of the channel is at most 50,000-60,000 hours. Usually, after the life time of the channel has passed, the channel is detached from the fuel assembly and a new channel is attached in place of the removed channel over the bundle of the fuel elements. The used (removed) channels are disposed of as radio active wastes.

This shortend life time of the channel is caused by the fact that, considerable difficulty has been found after 4-6 years use of the channel, that is, the channel deforms due to pressure difference between inside and outside of the channel. Under an usual operation, high pressured coolant flows inside the channel to cool the fuel elements and the channel has always outside force applied to deform by the pressure difference between inside and outside of the channel. Still more, the heat and the irradiation promote the deformation. The amount of the deformation is greater in the lower portion of the channel and smaller in the top and the middle of the channel.

One of the most serious problems associated with the deformation of the channel is that the passage defined between adjacent channels for the movement of the control rod becomes narrower, therefore it becomes impossible to control the operation of the reactor by the control rod.

Another problem associated with the deformation is that the coolant flowing inside the channel leaks at an opening produced by the deformation at the connecting point of the channel and the lower tie plate, therefore an effective cooling for the fuel element is not obtained.

Further problem associated with the deformation is increase of the radio active wastes due to the shorter lasting quality of the channel, which will be a great problem for the environmental pollution.

SUMMARY OF THE INVENTION

It is therefore an object of the present invention to provide an improved method of using a channel of fuel assemblies, which can stand long use of the channel.

Another object of the present invention is to provide an improved channel structure which can be assemblied over a bundle of fuel elements in an upended state.

According to the present invention, a fully open ended tubular channel, covering a bundle of fuel elements, is detached from the bundle after a predetermined period of operating time and thereafter again attached over the bundle or another bundle in an upended state.

DESCRIPTION OF THE PREFERRED EMBODIMENTS

Figure 1:
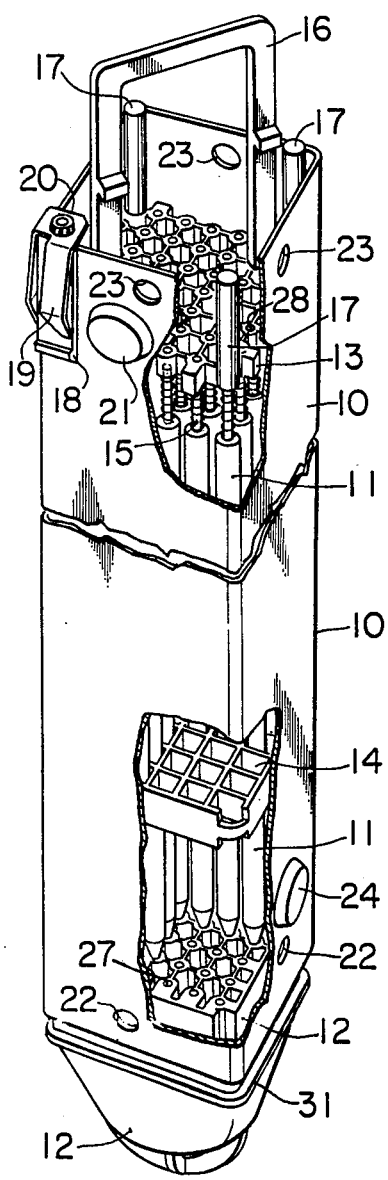
FIG. 1 is an schematic view, partly in section, of a fuel assembly of the present invention.

In FIG. 1 is illustrated a typical fuel assembly incorporating a tubular channel of the present invention. The fuel assembly consists of a fully open ended tubular channel 10, fuel elements 11, an upper tie plate 13, a lower tie plate 12, and fuel element spacer devices 14. The tubular channel 10 has substaintially square cross section. A plurality of fuel elements 11 are bundled together in the channel 10 with a spaced relation by a plurality of spacer devices 14. The lower end of the fuel element 11 is supported in cavities 27 of the lower tie plate 12. The lower tie plate 12 is tapered at its bottom and is supported by the internal structure of a reactor (not shown). The bottom of the channel 10 is fitted with the lower tie plate 12. The upper portion of the channel 10 is also fitted with the upper tie plate 13. The upper tie plate 13 is provided with threaded extension 17 at its corners and a handle 16.

A spring member 19 and a stopper 18 is mounted on one of upper corners of the channel 10 to support the channel 10 after it has been inserted over the bundle of the fuel elements. The spring member 19 and the stopper 18 is secured to the threaded extension 17 by a bolt 20.

The channel 10 is provided with upper channel spacer devices 21 and lower channel spacer devices 24 for the same purpose as the spring member 19 to define a given gap between adjacent channels. The upper two channel spacer devices 21 are mounted on the upper portion of the adjacent two sides of the channel 10 and the lower two channel spacer devices 24 are mounted on the lower portion of the other adjacent two sides of the channel 10, that is, when the channel is turned upside down and is turned for 180°, these channel spacer devices are mounted in the same arrangement as that before the turning of the channel 10.

Figure 4:
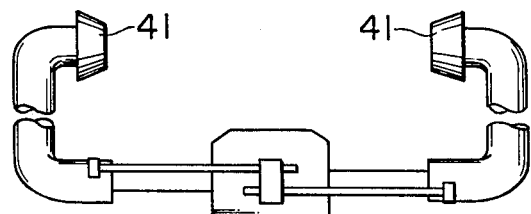
FIG. 4 is a perspective view of a tool used for attaching and detaching of a channel from the fuel assembly.

The channel 10 is also provided with holes 23 and 22 on the upper and lower portion of the channel 10 which is designed to fit a tool illustrated in FIG. 4. The upper holes 23 are used for detaching or attaching the channel 10 when the channel 10 is set as the illustrated state in the FIG. 1. The lower holes 22 are used when the channel 10 is set reversely around the bundle of the fuel elements 11.

The longitudinal expansion of the channel 10 is absorbed by a lower gap between the bottom of the channel 10 and a flanged portion 31 of the lower tie plate 12, and an upper gap between the top of the threaded extension 17 and the top of the channel 10.

Figure 2:
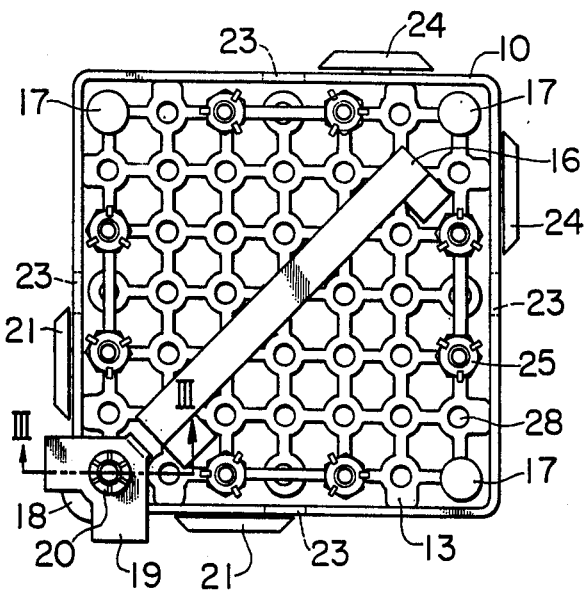
FIG. 2 is a top elevation of the fuel assembly as illustrated in the FIG. 1 of the present invention.

In FIG. 2 is illustrated a top elevation of the FIG. 1. The fuel elements are screwed in cavities 28 of the latticed upper tie plate 13 and held with a nut 25. The upper channel spacer devices 21 are mounted on the bottom and left hand sides of the upper portion of the channel 10, each by a rivet. The lower channel spacer devices 24 are mounted on the top and right hand sides of the lower portion of the channel 10, each by a rivet. The spring member 19 is mounted on the bottom left hand corner of the channel 10 and is secured to the threaded extension 17 by the bolt 20.

Figure 3:
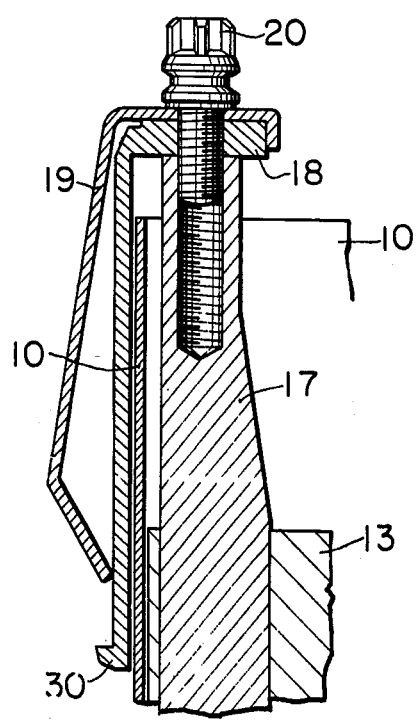
FIG. 3 is an enlarged sectional view of a top of the fuel assembly taken on line III—III in the FIG. 2.

In FIG. 3 is illustrated the details of the spring member 19. The leaf spring of the spring member 19 has outwardly and inwardly extending sections. When a load is applied by the adjacent channel, the spring member 19 is compressed. The compression of the spring member 19 is limited by a projection 30 of the stopper 18, which is mounted between the threaded extension 17 and the spring member 19. The lateral movement of the channel is limited by the upper tie plate 13 and the stopper 18.

FIG. 4 shows a tool used for detaching or attaching the channel. The distance between the projections 41 is adjusted by turning a screw 43 provided on a shaft 42 and the projections are fitted in upper holes 23 or lower holes 22 of the channel 10. The shaft 22 is provided with a handle 44 to lift up the tool by a crane (not shown).

According to the present method of using a channel, it is needed at least three steps of operation. That is, first, the channel 10 is removed from the fuel assembly, second, the removed channel is turned upside down and, finally, the reversed channel is again attached over the fuel assembly.

This reversing operation is accomplished in the reactor pool. After a predetermined period has passed, the bolt 20 is loosened, the spring member 19 and the stopper 18 are removed to disconnect the channel 10 from the bundle of the fuel elements.

The projections 41 of the tool in FIG. 4 are adjusted to be fitted in the upper holes 23 of the channel 10 and hang up the channel 10 by a crane (not shown) equiped in the reactor pool. The removed channel is placed on a workshop in the reactor pool. The tool is removed from the channel 10 and again fixed in the holes 22 of the opposite end of the channel 10. The channel 10 is hanged up by the crane in an upended state, and attached over the fuel assembly. The spring member 19 and stopper 18 are again secured by bolt.

In this reversing operation, if the channel 10 is provided with the channel spacer devices, for example, numeral 21 and 24, it is needed to turn the channel 10 for 180° after turned upside down to define the passage for the movement of the control rod.

Figure 5:
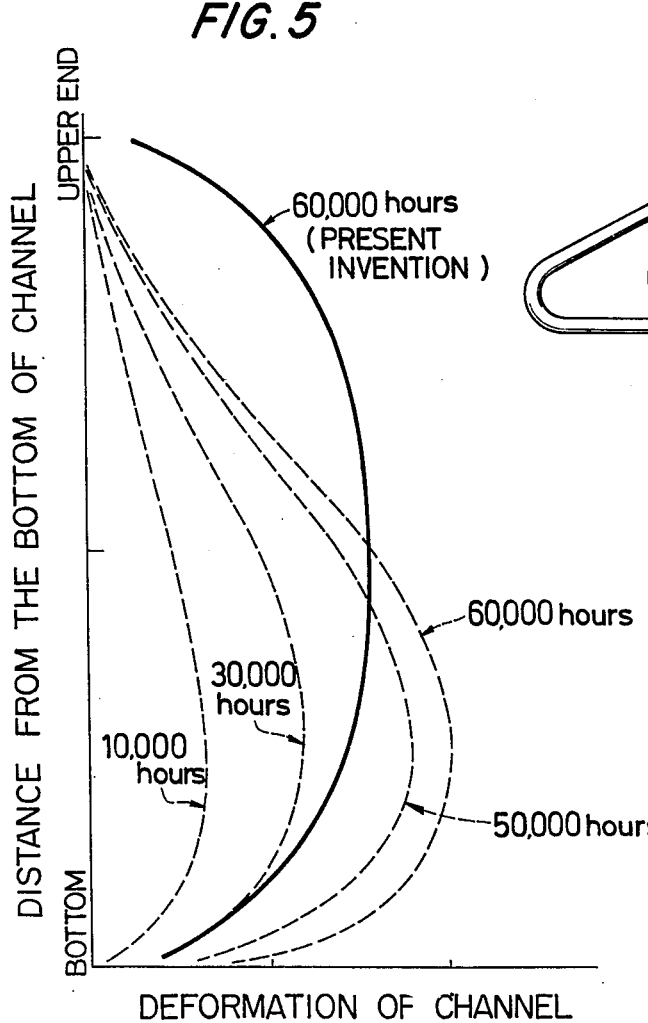
FIG. 5 is a graph showing a relation between the deformation of the channel and the distance from the bottom of the channel.

FIG. 5 shows an amount of deformation of the channel by taking measurements of distance between the opposite sides of the channel 10 at several points from the bottom to the top of the channel. Broken lines show results of measurements by the conventional method of using the channel, respectively after 10,000, 30,000, 50,000, and 60,000 hours. Real line shows a result of the measurements of the channel after 60,000 hours use of the present invention, in which the channel is used for 30,000 hours and thereafter used in an upended state for 30,000 hours. As a result of the present invention, the deformation of the channel is reduced and the life time of the channel is elongated.

It is desirable to reverse the channel repeatedly at a certain interval. The period of the reversion explained is 30,000 hours. In this period of the reversion, the life time of the channel increases 30%. The shorter the interval of the reversion, the longer the life time of the channel becomes. Further, it is desirable not only to reverse the channel of the same fuel assembly, but also exchange the used channel for another used channel, that is, the channel pulled out from one fuel assembly located in the central portion of the reactor core is reversed and again inserted over other fuel assemblies located in the periheral portion of the reactor core. By this reversion with rotation of location of the channel, the life time of the channel is further elongated. Still further it is desirable to do the reversion at the same time as the periodical inspection of the fuel elements.

What is claimed is:

1. A method of using a nuclear fuel assembly having a plurality of tubular fuel elements grouped together at fixed distances from each other to form a plurality of bundles of fuel elements, with each such bundle having a plurality of fuel elements, an upper tie plate provided at the top of each bundle of fuel elements to support the top thereof, a lower tie plate provided at the bottom of each bundle of fuel elements to support the bottom thereof, a cooling fluid conducting tubular channel having a uniform cross-section provided around the external surface of each bundle of fuel elements, combined together to form a nuclear fuel reactor core and being fixed in a reactor vessel, comprising the steps of: pulling out a tubular channel from the nuclear fuel assembly in an axial direction after a predetermined operating period; turning the pulled out channel upside down; axially inserting the turned channel in its upside down orientation into the fuel assembly; and fixing the inserted channel in said fuel assembly, whereby the distortions occurring within normal operation of said assembly are more evenly distributed along the length of said channel during its life.

2. A method of using a nuclear fuel assembly according to claim 1, including the step of rotating the pulled out channel 180° about its axis before said step of inserting.

3. A method of using a nuclear fuel assembly according to claim 2, wherein a channel pulled out from the central portion of the reactor core is inserted in the peripheral portion of the reactor core.

4. A method of using a nuclear fuel assembly according to claim 3, wherein said method is repeated after predetermined operating intervals.

5. A method of using a nuclear fuel assembly according to claim 1, wherein a channel pulled out from the central portion of the reactor core is inserted in the peripheral portion of the reactor core.

6. A method of using a nuclear fuel assembly according to claim 5, wherein said method is repeated after predetermined operating intervals.

7. A method of using a nuclear fuel assembly according to claim 1, wherein said method is repeated after predetermined operating intervals.

* * * * *